US010759680B2

(12) United States Patent
Patwardhan et al.

(10) Patent No.: US 10,759,680 B2
(45) Date of Patent: Sep. 1, 2020

(54) PREFERENTIAL REMOVAL OF HEXAVALENT CHROMIUM FROM CONTAMINATED WATER

(71) Applicant: UOP LLC, Des Plaines, IL (US)

(72) Inventors: Rashmi Patwardhan, Long Grove, IL (US); Richard R. Willis, Cary, IL (US); Jon E. Ball, Crystal Lake, IL (US); Paulina Jakubczak, Elk Grove Village, IL (US); Mark G. Riley, Hinsdale, IL (US); William C. Schwerin, Mount Prospect, IL (US); Roberto C. Flores, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 246 days.

(21) Appl. No.: 15/587,784

(22) Filed: May 5, 2017

(65) Prior Publication Data
US 2017/0334746 A1 Nov. 23, 2017

Related U.S. Application Data

(60) Provisional application No. 62/337,741, filed on May 17, 2016.

(51) Int. Cl.
| | | |
|---|---|---|
| *C02F 1/42* | (2006.01) | |
| *B01J 41/10* | (2006.01) | |
| *B01J 41/02* | (2006.01) | |
| *C02F 1/52* | (2006.01) | |
| *C02F 101/10* | (2006.01) | |
| *C02F 101/14* | (2006.01) | |
| *C02F 101/22* | (2006.01) | |

(52) U.S. Cl.
CPC ............... *C02F 1/42* (2013.01); *B01J 41/02* (2013.01); *B01J 41/10* (2013.01); *C02F 1/5236* (2013.01); *C02F 2001/422* (2013.01); *C02F 2101/10* (2013.01); *C02F 2101/103* (2013.01); *C02F 2101/105* (2013.01); *C02F 2101/106* (2013.01); *C02F 2101/14* (2013.01); *C02F 2101/22* (2013.01)

(58) Field of Classification Search
CPC combination set(s) only.
See application file for complete search history.

(56) References Cited

U.S. PATENT DOCUMENTS

| | | | |
|---|---|---|---|
| 3,616,344 A | 10/1971 | Peterson et al. | |
| 3,664,950 A | 5/1972 | Saraceno et al. | |
| RE30,066 E | 8/1979 | Oberhofer | |
| 4,752,397 A * | 6/1988 | Sood ..................... | C02F 1/281 |
| | | | 210/662 |
| 6,136,199 A | 10/2000 | Sengupta et al. | |
| 6,814,867 B2 | 11/2004 | Fodor et al. | |
| 2008/0035564 A1 * | 2/2008 | Moller ................. | B01J 20/06 |
| | | | 210/638 |
| 2010/0222626 A1 | 9/2010 | Nakamura | |

FOREIGN PATENT DOCUMENTS

| | | | |
|---|---|---|---|
| CN | 101293710 B | 7/2010 | |
| CN | 103127899 A | 6/2013 | |
| CN | 103496946 A | 1/2014 | |
| CN | 102886243 B | 9/2014 | |
| GB | 590599 A | 7/1947 | |
| WO | 2007112509 A1 | 10/2007 | |
| WO | 2009010376 A1 | 1/2009 | |
| WO | WO-2009010376 A1 * | 1/2009 | ............ C02F 1/5236 |
| WO | 2015193087 A1 | 12/2015 | |

OTHER PUBLICATIONS

Lazaridis et al. "Chromium (VI) removal from aqueous solutions by Mg—Al—CO3 hydrotalcite: sorption-desorption kinetic and equilibrium studies" (Ind. Eng. Chem. Res. 2004, 43, 2209-2215). (Year: 2004).*
PCT Search Report dated Sep. 14, 2017 for corresponding PCT International Application No. PCT/US2017/032625.
Hu, "Hexavalent chromium removal from near natural water by copper-iron bimetallic particles", Water Research 44 (2010) 3101-3108.
Chang, "Chrome reduction and heavy metals removal from wastewater—a pollution prevention approach", WM'01 Conference, Feb. 25-Mar. 1, 2001, Tucson, AZ.
Vetriselvi, "Redox polymer as an adsorbent for the removal of chromium (VI) and lead(II) from the tannery effluents", Water Resources and Industry 10 (2015) 39-52.
Arizaga, "Layered hydroxide salts: Synthesis, properties and potential applications", Solid State Ionics 178 (2007) 1143-1162.
Written Opinion from PCT application No. PCT/2017/032625, completed on Jul. 26, 2017.
International Preliminary Report on Patentability from PCT application No. PCT/2017/032625, dated Nov. 20, 2018.

* cited by examiner

*Primary Examiner* — Ryan B Huang

(57) ABSTRACT

A composition, process and apparatuses for removal of one or more contaminant anions from water are provided. In an embodiment, the process includes treating the water with a composition comprising a layered metal hydroxy salt, wherein the layered metal hydroxy salt is a compound comprising (a) a metal (b) a framework hydroxide, and (c) a replaceable anion.

18 Claims, No Drawings

PREFERENTIAL REMOVAL OF HEXAVALENT CHROMIUM FROM CONTAMINATED WATER

CROSS-REFERENCE TO RELATED APPLICATION

This application claims priority from Provisional Application No. 62/337,741 filed May 17, 2016, the contents of which cited application are hereby incorporated by reference in its entirety.

TECHNICAL FIELD

The technical field generally relates to materials, apparatuses and processes for removing contaminants from water. More particularly, the technical field generally relates to materials, apparatuses and processes for removing one or more contaminants selected from chromate, bichromate, dichromate, hexavalent chromium, selenite, selenate, arsenate, arsenite, perchlorate, iodate, bromate, vanadate, antimonite, antimonate, molybdate, phosphate, borate, fluoride and iodide from contaminated water using layered metal hydroxy salts.

BACKGROUND

Many industrial and ground waters are contaminated with oxyanions and other anions. There are a number of such contaminants that may be found in water including chromate, bichromate, dichromate, hexavalent chromium, selenite, selenate, arsenate, arsenite, perchlorate, iodate, bromate, vanadate, antimonite, antimonate, molybdate, phosphate, borate, fluoride, iodide, tungstanate, molybdate, bromide, chloride, and sulfate. Many of these oxyanions are present in the fossil fuels and hence migrate to the wastewater from the industries that refine these fossil fuels for commercial use. Many of these oxyanions are toxic to the health and environment. The release of many of these oxyanions to the environment is regulated by federal and local regulatory agencies. For example, the discharge limit for arsenic is 10 ppb for direct discharge. In certain ecologically sensitive areas it can be as low as 5 ppb total arsenic. Vanadate is also regulated for direct discharge. Generally arsenic is present as arsenite and arsenate depending on the pH and the oxidative properties of water. There are a number of technologies available for arsenate removal by first oxidizing arsenite to arsenate followed by co-precipitation/adsorption with iron salts. This method is effective but does generate a large volume of sludge. The disposal of the iron based sludge in a landfill is a common practice. The anaerobic conditions in a landfill will transform arsenate back to arsenite which would be mobilized to leachates. Chemical/precipitation also requires large foot print, high chemical and high sludge disposal cost making the overall treatment quite expensive. Ion exchange resins will also incur high costs due to frequent regeneration of the resins due to presence of sulfate commonly found in water/wastewater.

Chromium is a common heavy metal contaminant of water supplies, largely arising from the chrome plating, textile, leather tanning, and wood preservation treatment industries. Hexavalent chromium in groundwater originates due to past industrial activities such as chrome plating, cooling tower operation, and leather tanning. While trivalent chromium is an essential trace element for humans and plays an important role in the sugar regulation and fat metabolism, hexavalent chromium is very toxic to flora and fauna.

Hexavalent chromium is known for its negative health impact and is considered carcinogenic and mutagenic even at very low concentrations. It also causes allergic and asthmatic reactions and it is 1000 times more toxic than trivalent chromium. Exposure to hexavalent chromium causes diarrhea, stomach and intestinal bleeding, cramps, paralysis and liver and kidney damage. The treatment limits for hexavalent chromium are becoming very stringent and some states have lowered the acceptable treatment level to 10 ppb hexavalent chromium in treated water. Regulatory agencies demand that hexavalent chromium contamination is effectively removed to make water safer.

One of the current technologies to remove hexavalent chromium from water is to use polymeric anion exchange resins such as strong base anion (SBA) exchange resins. However, these regenerable ion exchange resins are non-selective and hence remove other competing anions such as sulfate requiring frequent regeneration of the resins. This frequent regeneration produces large quantities of spent regenerant containing high concentration of hexavalent chromium. The regenerant needs further treatment prior to appropriate disposal.

Another technology used is the use of weak base anion (WBA) exchange resins which is gaining acceptance due to an overall cost reduction compared to SBA exchange resins. However, one of the limitations with WBA resins is the requirement to lower the pH of the water (influent) to about 5 prior to treatment for optimum performance of these resins. The treated water (effluent) may also require another pH adjustment to raise the pH back to neutral. These pH adjustments are expensive. It is desirable that a product be developed which works in the normal pH range (neutral) of the typical chromium contaminated groundwater.

Yet another method for removal of hexavalent chromium from water is reduction-coagulation-filtration (RCF). In this process, hexavalent chromium is reduced to trivalent state by a reductant such as ferrous ions following precipitation and coagulation. The solids are generally separated by filtration. However, the current process is expensive and labor intensive. Further, it also generates large volume of sludge for disposal.

Another anion that may be present in some industrial waste waters is selenium. Selenium is an essential nutrient but it is required in extremely small quantities. At higher concentration it is toxic and poses risk to health and the environment for example skeletal deformities are observed in fish exposed to higher selenium concentration. Therefore, release of selenium to the environment is regulated by federal and local regulatory agencies. The selenium discharge requirements are becoming stringent and are often in the range of 5-12 ppb. Selenium is often found in fossil fuels such as coal and crude oil. Many industrial wastewaters such as petroleum refinery wastewater, mining leachate, coal mining and agricultural drainage water contain selenium. In petroleum refinery wastewater most of the selenium is present as selenite with small quantity of selenate. The total selenium present is normally in the range of a few hundred ppb as total selenium. These waters also contain interfering anions such as sulfate and chloride making existing technologies such as ion exchange resins cost prohibitive for commercial operation. Layered metal hydroxy salts have shown that total selenium can be removed to very low concentrations which could enable the industries to meet stringent discharge limit for total selenium.

Selenite can be removed by chemical/precipitation treatment such as by use of iron salts however, large quantities of these iron salts are needed resulting in very large quantities of sludge which needs to be disposed. Chemical/precipitation also requires large foot print, high chemical cost and large cost for sludge disposal making the treatment very costly. Ion exchange resins will also incur high costs due to frequent regeneration of the resins due to presence of sulfate. Use of copper salts has also been described however, it is not commercially viable since excess copper remains in the effluent making the treated water unacceptable for direct discharge.

Accordingly, it is desirable to provide materials, methods and apparatuses to remove hexavalent chromium, selenium, arsenic and other contaminants from contaminated water to meet stringent water quality requirements. Further, it is desirable to provide cost-effective materials, methods and apparatus that does not require pH adjustment for removal of hexavalent chromium from contaminated water. Moreover, it is desirable to provide materials, methods and apparatuses for preferential removal of hexavalent chromium from contaminated water containing competing anions. Furthermore, other desirable features and characteristics of the present subject matter will become apparent from the subsequent detailed description of the subject matter and the appended claims, taken in conjunction with the background of the subject matter.

BRIEF SUMMARY

Various embodiments contemplated herein relate to materials, apparatuses and processes for removing hexavalent chromium from water. The exemplary embodiments taught herein include materials, apparatuses and processes for removing hexavalent chromium from contaminated water using layered metal hydroxy salts.

In accordance with an exemplary embodiment, a process is provided for removal of one or more contaminants from water, the process comprising treating the water with a composition comprising a layered metal hydroxy salt, wherein the layered metal hydroxy salt is a compound comprising (a) a metal (b) a framework hydroxide, and (c) a replaceable anion. The layered metal hydroxy salt is preferably in a shaped form with macroscopic particles ranging from hundreds of microns to millimeter sizes. In particular, the shaped form should have a particle size of greater than 150 microns as compared to a particle size of about 5 microns of the powder prior to it being formed into its shaped form.

In accordance with another exemplary embodiment, a process is provided for the removal of one or more contaminants from water, the process comprising treating the contaminated water with a composition comprising a layered copper hydroxy salt, wherein the layered copper hydroxy salt is a compound comprising (a) copper (b) a framework hydroxide, and (c) a replaceable anion. The layered copper hydroxy salt is preferably in a shaped form with a particle size greater than 150 microns.

In accordance with yet another exemplary embodiment, a composition is provided for removal of hexavalent chromium from water comprising a layered metal hydroxy salt, wherein the layered metal hydroxy salt is a compound comprising (a) as the metal either (i) one or more divalent metals, such as zinc, copper, nickel, manganese, magnesium and cobalt or (ii) one or more trivalent metal(s) such as iron, aluminum, lanthanum and bismuth, or (iii) one of more tetravalent metal(s) such as titanium, zirconium, manganese, (b) a framework hydroxide, and (c) a replaceable anion. The layered metal hydroxy salt is preferably in a shaped form with a particle size greater than 150 microns.

It is advantageous to use layered metal hydroxy salts to remove one or more contaminants from contaminated water as it is not necessary to adjust the pH of the water during the process, thereby providing process improvement and cost-effectiveness. Further, the layered metal hydroxy salts provide preferential removal of hexavalent chromium, selenium, arsenic or other contaminants from contaminated water containing competing anions. These and other features, aspects, and advantages of the present invention will become better understood upon consideration of the following detailed description and appended claims.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

The present invention provides materials and a process for removal of hexavalent chromium, selenium, arsenic and other contaminant anions from water comprising treating the water with a composition comprising a layered metal hydroxy salt. The water may be obtained from a variety of sources including, but not limited to, industrial wastewater, municipal water and groundwater. For explanation purposes, the following specification has been described with respect to treating contaminated groundwater, however it will be understood that the composition as described in the present disclosure can be used for treating any water source comprising contaminant anions.

The layered metal hydroxy salts comprise a framework hydroxide. This means: non-replaceable hydroxide bonded to the metal(s). Additionally, metal hydroxy salts contain replaceable anions. The term "replaceable anion" means: anions which have the ability, upon contacting of the metal hydroxy salt with a solution of contaminant anions under suitable conditions, to be replaced by these other anions. The synthesized composition comprising the layered metal hydroxy salt removes contaminants such as hexavalent chromium from contaminated water to levels less than 10 ppb, for hexavalent chromium in treated water.

Metal hydroxy salts (MHS) differ from layered double hydroxides (LDH) in that the MHS include only divalent metals or only trivalent metals as compared to the LDH which include both a divalent and a trivalent metal. The LDH has a permanent charge on the material. The anion exchange properties for MHS are imparted by the presence of replaceable anion(s) between the hydroxide framework layers. The anion exchange takes place by substituting the replaceable anion between the metal hydroxide layers.

Metal hydroxy salts (MHS) for divalent metal cations can be represented as:

$$[(M^{2+},M'^{2+})_2(OH)_3]+(A^{n-}{}_{1/n}))$$

or $$[(M^{2+},M'^{2+})_5(OH)_8]^{2+}(A^{n-}{}_{2/n}))$$

where M and M' represent divalent metal cations which could be same or different; OH represents the hydroxy framework; A is the replaceable anion; and n is the valence of the anion.

In various embodiments, one or more divalent metals may include, but not limited to, zinc, copper, nickel, manganese, magnesium and cobalt and combinations thereof.

The trivalent metal cation MHS can be represented as:

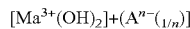

where Ma represents a trivalent metal cation, A is the replaceable anion; and n is the valence of the anion. In various embodiments, one or more trivalent metals may include, but not limited to, iron, aluminum, lanthanum, bismuth and combinations thereof. In some embodiments, the metal may be a tetravalent metal and may be selected from a group consisting of titanium, zirconium, manganese and combinations thereof. The as-prepared basic copper nitrate (BCN) powder particle size (<10 microns) is too small for use in flow-through columns, as high pressure drop across the beds would develop quickly. As such, the powder was converted into larger, more macroscopic particles on the order of hundreds of microns to several millimeters. Several approaches were tried, always with an eye toward self-bonding or minimal use of binder in order to maximize active material within the particles. Forming techniques that can be utilized include extrusion, nodulization, accretion methods, agglomeration methods, high shear mixing and/or granulation methods, pressing methods, pelletization methods, spray drying and generally any related technique wherein a wetted paste, dough, slurry or similar powder and solvent (usually water) and/or sometimes binder, is allowed or forced to grow to macroscopic size with favorable and desired physical properties.

The preferred active, formed material is self-bonded, i.e., with a binder. Because of the inherent stability of these layered hydroxide materials, they are formed and dried at <150° C. in such a way as to not induce binder blinding. Resultant active formed materials (e.g., beads, pellets or granules) are water insoluble and stable at pH 5 to 9, strong and attrition resistant, and non-toxic (if leached). The layered hydroxide material salt is preferably in a shaped form with a particle size greater than 150 microns.

The following example of the preparation of the material used to remove contaminants is presented to further illustrate to persons skilled in the art how to make and use the invention. This example is not intended as a limitation, however, upon the scope of the present invention.

A mixture of a material active for hexavalent chromium removal from groundwater and a support material is provided. In one embodiment, the active material is basic copper nitrate, and the support material is alumina powder capable of rehydration. In different embodiments, the copper content of the mixture, calculated as CuO on a volatile-free basis, is between about 5 mass percent and 100 mass percent. Green formed active materials are formed from the mixture. In one embodiment, beads are formed by nodulizing the mixture in a rotating pan nodulizer while spraying with a liquid. In one embodiment, the liquid comprises water. In one embodiment, the liquid comprises a solution of water and a mineral acid. In one embodiment, the mineral acid is nitric acid. In one embodiment, the mineral acid is sulfuric acid.

In one embodiment, pellets are formed by extruding the mixture into various shapes. Prior to extrusion, the mixture is exposed to a liquid until an extrudable mass is obtained. In one embodiment, the liquid comprises water. In one embodiment, the liquid comprises a solution of water and a mineral acid. In one embodiment, the mineral acid is nitric acid. In one embodiment, the mineral acid is sulfuric acid. In one embodiment, beads are formed by spray drying the mixture. Prior to spray drying, the mixture is exposed to a liquid to form a slurry. In one embodiment, the liquid comprises water. In one embodiment, the liquid comprises a solution of water and a mineral acid. In one embodiment, the mineral acid is nitric acid. In one embodiment, the mineral acid is sulfuric acid. In one embodiment, beads are formed by agglomeration. Prior to agglomerating, the mixture is exposed to a liquid until a suitable mass is formed. In one embodiment, the liquid comprises water. In one embodiment, the liquid comprises a solution of water and a mineral acid. In one embodiment, the mineral acid is nitric acid. In one embodiment, the mineral acid is sulfuric acid. In one embodiment, beads are formed when aggregating the mixture. Prior to aggregating, the mixture is exposed to a liquid until a suitable mass is formed. In one embodiment, the liquid comprises water. In one embodiment, the liquid comprises a solution of water and a mineral acid. In one embodiment, the mineral acid is nitric acid. In one embodiment, the mineral acid is sulfuric acid. Those skilled in the art will appreciate that other methods may be performed to produce regular- or irregular-shaped beads, pellets, or other macroscopic particles that fall within the scope of the present invention. The material, such as the basic layered copper hydroxy salt is preferably in a shaped form with a particle size greater than 150 microns.

The green formed active materials are dried. In one embodiment, the formed active particles are dried in the spray dryer. In one embodiment, the drying of the other formed active materials occurs at about 60° C. In one embodiment, the formed active particles are dried at temperatures at or below 150° C.

Examples of the one or more contaminant anions that may be removed by the composition comprising the layered metal hydroxy salt may include, but not limited to, chromate, bichromate, dichromate, chloride, sulfate, selenite, selenate, arsenate, arsenite, perchlorate, iodate, bromate, vanadate, antimonite, antimonate, tungstate, molybdate, phosphate, borate, fluoride, and iodide.

In various embodiments, the one or more replaceable anions may be selected from the group consisting of nitrate, sulfate, sulfite, chloride, bromide, carbonate, bicarbonate, acetate, citrate, formate, oxalate, succinate or glutarate and their combinations thereof. In accordance with exemplary embodiments, the composition comprises no less than 70 wt %, preferably no less than 80 wt % and more preferably no less than 90 wt % layered metal hydroxy salt.

In accordance with various embodiments, the composition is entirely layered metal hydroxy salts. In accordance with an exemplary embodiment, the layered metal hydroxy salt is a layered copper hydroxy salt. In accordance with another exemplary embodiment, the layered metal hydroxy salt is a layered copper hydroxy nitrate. Exemplary methods for synthesis of layered metal hydroxy salts are set forth in the following paragraphs.

There are a number of methods in the literature for synthesizing these materials and some of these are listed below (Gregorio Guadalupe Carbajal Arizaga, Kestur Gundappa Satyanarayana, Fernando Wypych; SOLID STATE IONICS; 178 (2007) 1143-1162).

Precipitation/titration method: The respective metal salt is dissolved in preferably de-carbonated Deionized (DI) water (e.g. Cu $(NO_3)_2$ 1M; 200 mL) followed by a slow drop-wise addition of a base (NaOH; 1M) over a period of at least 2 hours while maintaining a neutral pH. The solution/suspension is stirred for at least 24 hours at about 40° C. or higher. The suspension of an insoluble metal hydroxy salt is separated and then dried. Slow hydrolysis of metal oxide: Metal oxide is placed in a solution of metal salt followed by mixing it gently for a period of about 5-15 days. The change of color of metal oxide indicates formation of metal hydroxy salt. The precipitate is then separated and dried. Hydrothermal method: Salt solution of the metal is treated with a base such as sodium hydroxide followed by hydrothermal treatment at 125-150° C. for 48 hours. The precipitate is filtered, washed and then dried. Vapor diffusion catalysis method: A metal salt solution such as a chloride salt solution is reacted with gaseous phase ammonia at room temperature in a sealed reactor chamber isolated from atmosphere. The metal hydroxide salt is formed when a visible insoluble form of salts is observed on the surface of the metal salt solution. Reaction with urea: Metal hydroxy salts can be prepared by reaction of the metal salt solution with urea at 140° C. for at least one hour. The formed product is cooled to room temperature, filtered, washed with Deionized (DI) water followed by drying. Cation replacement from metal hydroxide: Metal hydroxy salts can be prepared by adding respective metal ion salt solution to the dispersion of insoluble $Mg(OH)_2$. The concentration of the desired salt solution should be in excess of $Mg(OH)_2$ concentration. Anion exchange: A metal hydroxy salt can be prepared with any of the methods above where the labile anion can be exchanged with another anion by treating it with a respective salt of the desired anion. For example a metal hydroxy sulfate can be prepared by anion exchange of metal hydroxy nitrate with sodium sulfate solution. In various embodiments, hexavalent chromium present in contaminated water may be removed with concurrent replacement of the replaceable anion present in the layered metal hydroxy salt. In accordance with some exemplary embodiments, the hexavalent chromium present in the contaminated water may be removed by anion replacement in a layered hydroxy salt. In an aspect, hexavalent chromium present in the water may be removed via ion-exchange with the replaceable anion present in the layered metal hydroxy salt. In some embodiments, hexavalent chromium present in the contaminated water may be removed via adsorption or chemical precipitation. In accordance with various embodiments, the hexavalent chromium is preferentially removed over at least the chloride and sulfate present in contaminated water.

In accordance with an exemplary embodiment, the process for removal of hexavalent chromium from contaminated water may be carried out in a typical column arrangement where one or more adsorbent columns are used in series and a number of trains can be installed in parallel depending on the flow rate. In as aspect, an exemplary column arrangement may include one lead column, one or more lag columns comprising a first lag column and a second lag column, and a polishing column. In operation, a stream comprising contaminated water comprising hexavalent chromium and one or more contaminant anions, to be treated is passed through the one or more adsorbent columns containing the composition comprising the layered metal hydroxy salt. The composition may be present in the form of powder or formed shapes in one or more adsorbent columns. Subsequently, the stream obtained from the absorbent columns is passed through a polishing column to obtain a treated water stream. In an aspect, when the lead column is exhausted, the first lag column will become the lead column and a new column will be placed at the end as the polishing column and so on. In another aspect, the column arrangement may further include a particulate removal column for filtering particulate solids from the contaminated water before passing the contaminated water through the one or more adsorbent columns.

In accordance with another exemplary embodiment, the process for removal of hexavalent chromium from contaminated water may be carried out in continuous stirred tank reactor (CSTR). The composition comprising the metal hydroxy salt may be added as powder or formed shape to a CSTR containing contaminated water and after the desired mixing treated water can be separated by various methods including gravity separation, filtration or centrifugation.

In accordance with yet another exemplary embodiment, the process for removal of hexavalent chromium from contaminated water comprises contacting contaminated water with the composition in a media filtration system such as multimedia filtration to obtain treated water.

While certain representative embodiments and details have been shown for purposes of illustrating the invention, it will be apparent to those skilled in the art that various changes in the compositions and methods disclosed herein may be made without departing from the scope of the invention, which is defined in the appended claims.

EXAMPLES

The following are examples of the removal of hexavalent chromium and other contaminant anions from the contaminated groundwater, in accordance with exemplary embodiments. The following example are provided for illustration purposes only and are not meant to limit the various embodiments of apparatuses and methods for removal of hexavalent chromium from water in any way. Further, following examples can be carried out using any of the listed methods in the specification or any other method well known to carry out such processes.

Example 1

An exemplary study was carried out on simulated groundwater including about 10 ppm hexavalent chromium, a starting pH of 6.67 with a liquid to solid ratio of 500. TABLE 1 shows amounts of hexavalent chromium and other contaminant anions removed from the contaminated groundwater over a period of 24 hours on treatment with a layered copper hydroxy nitrate.

TABLE 1

Removal of hexavalent chromium (10 ppm) from simulated groundwater in presence of other anions

| Time (hrs.) | Cr (VI), ppm | Cu, ppm | Chloride, ppm | Sulfate, ppm |
|---|---|---|---|---|
| 0 | 10.16 | <1 | 234 | 81 |
| 0.5 | 3.4 | <1 | 231 | 74 |
| 1 | 1.9 | <1 | 228 | 73.3 |
| 2 | 1.4 | <1 | 232 | 74.9 |
| 4 | 0.9 | <1 | 232 | 73.6 |
| 7 | 0.74 | <1 | 229 | 72.8 |
| 24 | 0.44 | <1 | 228 | 68.8 |

As evident from TABLE 1, hexavalent chromium concentration was significantly reduced (<1 ppm) before significant removal of the competing anions i.e. the chloride and sulfate. Accordingly, the instant example illustrates layered copper hydroxy nitrate preferentially removes hexavalent chromium over at least chlorides and sulfates present in simulated contaminated groundwater.

Example 2

Another exemplary study was carried out on contaminated groundwater including about 100 ppm hexavalent chromium having a starting pH of 6.67 and a liquid to solid ratio of 500. TABLE 2 shows amounts of hexavalent chromium and other anions removed from the contaminated groundwater over a period of 24 hours on treatment with a layered copper hydroxy nitrate.

TABLE 2

Removal of hexavalent chromium (100 ppm) from simulated groundwater in presence of other anions

| Time (hrs.) | Cr (VI), ppm | Cu, ppm | Chloride, ppm | Sulfate, ppm |
|---|---|---|---|---|
| 0 | 100.2 | <1 | 264 | 76.3 |
| 0.5 | 72 | <1 | 252 | 73.7 |
| 1 | 68.7 | <1 | 254 | 74.8 |
| 2 | 57.1 | <1 | 249 | 72.9 |
| 4 | 50.7 | <1 | 256 | 74.8 |
| 7 | 37.5 | <1 | 255 | 75.1 |
| 24 | 2.95 | <1 | 257 | 71 |

As evident from TABLE 2, hexavalent chromium concentration was significantly reduced (<3 ppm) before significant removal of the competing anions i.e. the chloride and sulfate. Accordingly, the instant example illustrates that layered copper hydroxy nitrate preferentially removes hexavalent chromium over at least chlorides and sulfates present in contaminated groundwater even in case of high concentrations of hexavalent chromium.

In another exemplary experiment, sample of deionized water with Cr and sulfate only, having pH adjusted to 7 and a liquid to solid ratio of about 500 was treated with layered copper hydroxy nitrate over an equilibrium period of 72 hours. TABLE 3 shows amounts of hexavalent chromium removed from the water for various mole ratios of hexavalent chromium to sulfate using layered copper hydroxy nitrate.

TABLE 3

Removal of hexavalent chromium (52 ppm) from water containing various mole ratios of hexavalent chromium and sulfate at pH 7

| Target Mole ratio Cr (VI)/Sulfate | Initial Cr (VI), ppm | Final Cr (VI), ppm | Initial Sulfate, ppm | Final Sulfate, ppm | Actual Mole ratio Cr (VI)/Sulfate |
|---|---|---|---|---|---|
| 4 | 53.8 | 0.038 | 20 | 1 | 4.967 |
| 2 | 51.6 | 0.013 | 53 | 2 | 1.798 |
| 1 | 51.3 | 0.034 | 89 | <1 | 1.064 |
| 0.5 | 53.9 | 0.086 | 177 | <1 | 0.562 |
| 0.2 | 51.1 | 0.079 | 417 | 155 | 0.226 |
| 0.1 | 51.8 | 0.214 | 845 | 564 | 0.113 |
| 0.04 | 51.8 | 0.304 | 2037 | 1744 | 0.047 |
| 0.02 | 51.4 | 0.57 | 3857 | 3626 | 0.025 |
| 0.01 | 53.3 | 1.420 | 8578 | 8197 | 0.011 |

As evident from TABLE 3, in spite of increasing the mole ratio of sulfate 100 times more than Cr (VI), significant amount of hexavalent chromium is still removed from water to concentration of about 1 ppm.

In yet another exemplary experiment, sample of deionized water with Cr and chloride only, having pH adjusted to 7 and a liquid to solid ratio of about 500 was treated with layered copper hydroxy nitrate over an equilibrium period of 72 hours. TABLE 4 shows amounts of hexavalent chromium removed from the water for various mole ratios of hexavalent chromium to chloride using layered copper hydroxy nitrate.

TABLE 4

Removal of hexavalent chromium (52 ppm) from water containing various mole ratios of hexavalent chromium and chloride at pH 7

| Target Mole ratio Cr(VI)/Cl | Initial Cr(VI), ppm | Final Cr(VI), ppm | Initial Chloride, ppm | Final chloride, ppm | Actual Mole ratio Cr(VI)/Cl |
|---|---|---|---|---|---|
| 2 | 54 | 0.015 | 6 | 6 | 6.137 |
| 1 | 56.53 | 0.026 | 25 | 24 | 1.542 |
| 0.5 | 53.6 | 0.022 | 56 | E | 0.653 |
| 0.2 | 59.47 | 0.018 | 160 | 11 | 0.253 |
| 0.1 | 51.87 | 0.019 | 319 | 129 | 0.111 |
| 0.04 | 53.2 | 0.018 | 806 | 611 | 0.045 |
| 0.02 | 51.6 | 0.102 | 1609 | 1403 | 0.022 |
| 0.01 | 51.6 | 3.68 | 3150 | 2950 | 0.011 |

As can be seen from the TABLE 4 that in spite of increasing the mole ratio of chloride to 100 times more than Cr (VI), a significant amount of hexavalent chromium is removed from contaminated water.

Example 3

A study was carried out on water containing selenium. The simulated petroleum refinery wastewater contained competing anions, including about 400 ppm sulfate and 450 ppm chloride. The total selenium concentration was 150-180 ppb of which 85% by weight was present as selenite and the rest was selenate (15% by weight). The pH of the solution was 7.5. The results in Table 5 demonstrate that a very high percentage of selenium was removed despite high concentrations of the competing anions. The results show that the significant selenium is removed including selenate by layered Metal Hydroxy Salt (MHS) product. SBA and WBA are polymeric strong base anion exchange resins and weak base anion exchange resin, respectively. As can be seen here these ion exchange resins are not very effective due to presence of competing anions such as sulfate. Zero Valent Iron (ZVI) has also been suggested in the literature to remove selenium from selenium containing waters but results here indicate that ZVI was not very effective for removal of selenium from the refinery wastewater. FeOOH has also been listed in the literature for removal of selenium from industrial water systems, the results here suggest that FeOOH is not effective for removal of selenate, all of the selenium in the selenate form remains in the water. Layered metal hydroxy salt has shown efficacy for removal of selenite and selenate from the refinery wastewater

TABLE 5

Testing of various products for removal of Selenium from Simulated refinery wastewater

| Material | Residual Se Conc., ppb | % Se Removal |
|---|---|---|
| SBA | 165 | 6 |
| WBA | 146 | 17 |
| ZVI (1-3 um) | 53 | 70 |
| FeOOH | 26 | 85 |
| MHS | 5 | 97 |

Note:
Initial total selenium concentration was 175 ppb (149 ppb selenite + 26 ppb selenate)
Adsorbent Dosage (MHS): 2 g/L; pH 7.5, Equilibrium Time: 72 hours Specific Embodiments While the following is described in conjunction with specific embodiments, it will be understood that this description is intended to illustrate and not limit the scope of the preceding description and the appended claims.

A first embodiment of the invention is a process for removal of one or more contaminant anions from water, the process comprising treating the water with a composition comprising a layered metal hydroxy salt, wherein the layered metal hydroxy salt is a compound comprising (a) a metal (b) a framework hydroxide, and (c) a replaceable anion. An embodiment of the invention is one, any or all of prior embodiments in this paragraph up through the first embodiment in this paragraph, wherein the one or more contaminant anions are selected from the group consisting of chromate, bichromate, dichromate, hexavalent chromium, selenite, selenate, arsenate, arsenite, perchlorate, iodate, bromate, vanadate, antimonite, antimonate, molybdate, phosphate, borate, fluoride and iodide. An embodiment of the invention is one, any or all of prior embodiments in this paragraph up through the first embodiment in this paragraph, wherein the metal in the layered metal hydroxy salt comprises one or more divalent metals, selected from the group consisting of zinc, copper, nickel, manganese, magnesium and cobalt and combinations thereof. An embodiment of the invention is one, any or all of prior embodiments in this paragraph up through the first embodiment in this paragraph, wherein the metal in the layered metal hydroxy salt comprises one or more trivalent metals, selected from the group consisting of iron, aluminum, lanthanum, bismuth and combinations thereof. An embodiment of the invention is one, any or all of prior embodiments in this paragraph up through the first embodiment in this paragraph, wherein the metal in the layered metal hydroxy salt comprises one or more tetravalent metals selected from the group consisting of titanium, zirconium, manganese and combinations thereof. An embodiment of the invention is one, any or all of prior embodiments in this paragraph up through the first embodiment in this paragraph, wherein the replaceable anion is selected from the group consisting of nitrate, sulfate, sulfite, chloride, bromide, carbonate, bicarbonate, acetate, citrate, oxalate, succinate or glutarate and combinations thereof. An embodiment of the invention is one, any or all of prior embodiments in this paragraph up through the first embodiment in this paragraph, wherein the layered metal hydroxy salt is a layered copper hydroxy salt. An embodiment of the invention is one, any or all of prior embodiments in this paragraph up through the first embodiment in this paragraph, wherein the layered copper hydroxy salt is a layered copper hydroxy nitrate. An embodiment of the invention is one, any or all of prior embodiments in this paragraph up through the first embodiment in this paragraph, wherein the contaminant anion present in the water is removed with concurrent substitution of the replaceable anion present in the layered metal hydroxy salt. An embodiment of the invention is one, any or all of prior embodiments in this paragraph up through the first embodiment in this paragraph, wherein the contaminant anion present in the water is removed by adsorption onto the layered hydroxy salt. An embodiment of the invention is one, any or all of prior embodiments in this paragraph up through the first embodiment in this paragraph, wherein the contaminant anion present in the water is removed by ion-exchange or chemical precipitation. An embodiment of the invention is one, any or all of prior embodiments in this paragraph up through the first embodiment in this paragraph, wherein the step of treating comprises passing a stream comprising the water through one or more adsorbent columns containing the composition comprising the layered metal hydroxy salt. An embodiment of the invention is one, any or all of prior embodiments in this paragraph up through the first embodiment in this paragraph, wherein the hexavalent chromium is preferentially removed over at least chloride and sulfate present in water. An embodiment of the invention is one, any or all of prior embodiments in this paragraph up through the first embodiment in this paragraph, wherein the layered metal hydroxy salt comprises macroscopic particles having a diameter of from 100 microns to 5 mm.

A second embodiment of the invention is a process for the removal of hexavalent chromium, selenium or arsenic from water, the process comprising treating contaminated water with a composition comprising a layered copper hydroxy salt, wherein the layered copper hydroxy salt is a compound comprising (a) copper (b) a framework hydroxide, and (c) a replaceable anion. An embodiment of the invention is one, any or all of prior embodiments in this paragraph up through the second embodiment in this paragraph, wherein the replaceable anion is selected from the group consisting of nitrate, sulfate, sulfite, chloride, bromide, carbonate, bicarbonate, acetate, citrate, oxalate, succinate or glutarate and combinations thereof. An embodiment of the invention is one, any or all of prior embodiments in this paragraph up through the second embodiment in this paragraph, wherein the layered copper hydroxy salt is a layered copper hydroxy nitrate. An embodiment of the invention is one, any or all of prior embodiments in this paragraph up through the second embodiment in this paragraph, wherein hexavalent chromium, selenium or arsenic present in the contaminated water is removed with concurrent replacement of the anion present in the layered copper hydroxy salt. An embodiment of the invention is one, any or all of prior embodiments in this paragraph up through the second embodiment in this paragraph wherein the hexavalent chromium, selenium or arsenic present in the water is removed by adsorption onto the layered hydroxy salt.

A third embodiment of the invention is a layered metal hydroxy salt, wherein the layered metal hydroxy salt is a compound comprising (a) a metal (b) a framework hydroxide, and (c) a replaceable anion and the layered metal hydroxy salt has a shaped form with a particle size greater than 150 microns.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for removal of one or more contaminant anions from water, the process comprising treating the water with a composition comprising a layered metal hydroxy salt, wherein the layered metal hydroxy salt is a compound comprising (a) a metal, wherein the metal includes only divalent metals or only trivalent metals (b) a framework hydroxide, and (c) a replaceable anion.

2. The process of claim 1, wherein the one or more contaminant anions are selected from the group consisting of chromate, bichromate, dichromate, hexavalent chromium, selenite, selenate, arsenate, arsenite, perchlorate, iodate, bromate, vanadate, antimonite, antimonate, molybdate, phosphate, borate, fluoride and iodide.

3. The process of claim 1, wherein the metal in said layered metal hydroxy salt comprises one or more divalent metals, selected from the group consisting of zinc, copper, nickel, manganese, magnesium and cobalt and combinations thereof.

4. The process of claim 1, wherein the metal in said layered metal hydroxy salt comprises one or more trivalent metals, selected from the group consisting of iron, aluminum, lanthanum, bismuth and combinations thereof.

5. The process of claim 1, wherein the replaceable anion is selected from the group consisting of nitrate, sulfate, sulfite, chloride, bromide, carbonate, bicarbonate, acetate, citrate, oxalate, succinate, glutarate and combinations thereof.

6. The process of claim 1, wherein the layered metal hydroxy salt is a layered copper hydroxy salt.

7. The process of claim 6, wherein the layered copper hydroxy salt is a layered copper hydroxy nitrate.

8. The process of claim 1, wherein the one or more contaminant anions present in the water are removed with concurrent substitution of the replaceable anion present in the layered metal hydroxy salt.

9. The process of claim 1, wherein the one or more contaminant anions present in the water are removed by adsorption onto the layered hydroxy salt.

10. The process of claim 1, wherein the one or more contaminant anions present in the water are removed by ion-exchange or chemical precipitation.

11. The process of claim 1, wherein the step of treating comprises passing a stream comprising the water through one or more adsorbent columns containing the composition comprising the layered metal hydroxy salt.

12. The process of claim 1, wherein hexavalent chromium is removed preferentially over at least chloride ions and sulfate ions present in the water.

13. The process of claim 1, wherein said layered metal hydroxy salt comprises macroscopic particles having a diameter of from 100 microns to 5 mm.

14. A process for the removal of hexavalent chromium, selenium or arsenic from water, the process comprising treating contaminated water with a composition comprising a layered copper hydroxy salt, wherein the layered copper hydroxy salt is a compound comprising (a) copper, wherein the copper includes only divalent copper or only trivalent copper (b) a framework hydroxide, and (c) a replaceable anion.

15. The process of claim 14, wherein the replaceable anion is selected from the group consisting of nitrate, sulfate, sulfite, chloride, bromide, carbonate, bicarbonate, acetate, citrate, oxalate, succinate, glutarate and combinations thereof.

16. The process of claim 14, wherein the layered copper hydroxy salt is a layered copper hydroxy nitrate.

17. The process of claim 14, wherein the hexavalent chromium, selenium or arsenic present in the contaminated water is removed with concurrent replacement of the anion present in the layered copper hydroxy salt.

18. The process of claim 14 wherein the hexavalent chromium, selenium or arsenic present in the water is removed by adsorption onto the layered copper hydroxy salt.

\* \* \* \* \*